No. 663,352. Patented Dec. 4, 1900.
E. F. MORSE.
DRIVE CHAIN.
(Application filed Feb. 26, 1898.)

(Model.)

Witnesses:
C. L. Belcher
Wm H. Capel

Inventor
Everett F. Morse
By
Townsend & Decker
Attorneys

UNITED STATES PATENT OFFICE.

EVERETT F. MORSE, OF TRUMANSBURG, NEW YORK, ASSIGNOR TO THE MORSE CHAIN COMPANY, OF SAME PLACE.

DRIVE-CHAIN.

SPECIFICATION forming part of Letters Patent No. 663,352, dated December 4, 1900.

Application filed February 26, 1898. Serial No. 671,765. (Model.)

*To all whom it may concern:*

Be it known that I, EVERETT F. MORSE, a citizen of the United States, and a resident of Trumansburg, in the county of Tompkins and State of New York, have invented certain new and useful Improvements in Drive-Chains, of which the following is a specification.

This invention relates to sprocket-chains for general driving purposes, but especially to that class of these chains wherein a roller is interposed to make engagement with the sprocket.

It further relates to those chains having a two-part bearing pin or pintle in which said parts are made of hardened tool-steel and roll one upon the other, reducing thereby friction and wear and the consequent lengthening of the chain and the destruction of the sprockets. This latter class of chains is exemplified in Patent No. 583,150, granted May 25, 1897.

One of the greatest objections to sprocket-chains is the lengthening or stretching thereof by use, since it increases the pitch of the chain beyond that of the sprocket-wheels and causes the links to gouge out the sprocket-teeth. It also necessitates frequent adjustment of the sprocket-wheels to take up slack in the chain or the extraction of links from the chain for the same reason.

The object of this invention is to produce a drive-chain in which both these defects are overcome and which for that reason shall have a minimum amount of friction in its joints and upon the sprockets and which shall be durable and to the greatest possible degree devoid of a tendency to lengthen or stretch by use.

To this end the invention consists in the construction, combination, and arrangement of the parts of a drive-chain, as hereinafter fully described, and set forth in the claims.

Figure 1:
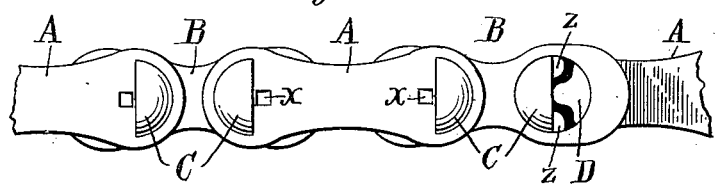
Figure 2:
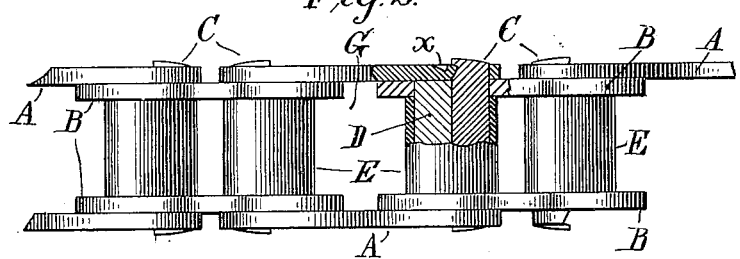
Figure 3:
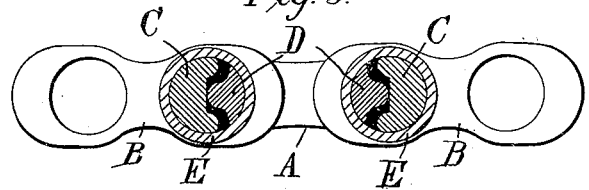
Figure 4:
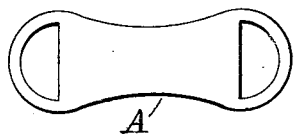
Figure 5:
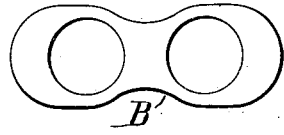

In the accompanying drawings, which form a part of this specification, Figure 1 represents in edge view or side elevation a drive-chain embodying the invention. Fig. 2 is a partially-sectionized plan view of the subject of Fig. 1. Fig. 3 is a longitudinal section of a portion of the chain seen in the first two figures. Figs. 4 and 5 show the outer and inner side links, respectively.

The parts of the chain may be designated as follows, viz: A refers to the outside links, B to the inside links, C to that part of the pintle which may be termed the "seat-pin," D to that part of the pintle which may be termed the "rocking pin," and E to the roller or sleeve surrounding the parts of the pintle.

The parts A, C, and D are substantially the same as in the patent above referred to and are in detail and manner of assembling the same as illustrated in my Patent No. 583,151, granted May 25, 1897—*i. e.*, the metal of the outside links A is forced into a nick in the seat-pin C, as at X, and said pins are provided with the shoulders Z for maintaining the side links at the proper distance apart, as fully set forth in the latter patent.

The inside link B has circular holes therein and surrounds both parts of the pintle, the rocking pin D resting at its ends in said holes and bearing along its narrow edge upon the central line of the seat-pin, as shown. Around the parts of the pintle and between the inside links the sleeve or roller E is placed and fitted to roll freely about the pintle and to roll into and out of engagement with the sprocket-teeth as the chain passes over the sprocket-wheels. The roller or sleeve may be made of any suitable material, but preferably of very hard steel. Then the parts of the pintle being of the best hardened tool-steel there can be but little wear between the sleeve and the pintle and but little friction between the chains and the sprocket-teeth.

The inside links B are preferably prolonged beyond the pintle-holes, as shown, so as to insure the engagement of the sprocket-teeth with the sleeves E and to make it impossible for said teeth as they enter the apertures G to strike the ends of said links.

In a chain thus constructed the inside links, as well as the outside ones, may be punched and so save the trouble and expense of boring center links or blocks as in the chains forming the subject of the aforesaid patents.

The invention claimed is—

1. In a drive-chain the combination with the outside links, seat-pins connecting them, the inside links through which the seat-pins pass, the rocking pins confined at their ends in the inside links and extending alongside of and bearing against the seat-pins, and the rollers E, extending between the inside links and surrounding the seat-pins and rocking pins and pressing upon the rocking pins when engaging the sprockets.

2. In a drive-chain having a two-part pintle wherein the said parts are placed side by side and rock upon one another, the combination with each of said pintles, of a hardened sleeve surrounding the parts thereof and bearing upon the movable part of the pintle when engaging the sprockets.

Signed at Trumansburg, in the county of Tompkins and State of New York, this 23d day of February, A. D. 1898.

EVERETT F. MORSE.

Witnesses:
FRANK L. MORSE,
DAVID B. PERRY.